US010034237B2

(12) United States Patent
Pularikkal et al.

(10) Patent No.: US 10,034,237 B2
(45) Date of Patent: Jul. 24, 2018

(54) SYSTEM AND METHOD TO FACILITATE HOTSPOT ONBOARDING FOR USER EQUIPMENT IN A NETWORK ENVIRONMENT

(71) Applicant: CISCO TECHNOLOGY, INC., San Jose, CA (US)

(72) Inventors: Gangadharan Byju Pularikkal, San Jose, CA (US); Mark Grayson, Maidenhead (GB); Jerome Henry, Pittsboro, NC (US); Raghavaiah Avula, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/249,072

(22) Filed: Aug. 26, 2016

(65) Prior Publication Data
US 2017/0230905 A1    Aug. 10, 2017

Related U.S. Application Data

(60) Provisional application No. 62/292,710, filed on Feb. 8, 2016.

(51) Int. Cl.
*H04W 48/20* (2009.01)
*H04W 12/06* (2009.01)
(Continued)

(52) U.S. Cl.
CPC ............ *H04W 48/20* (2013.01); *H04W 8/18* (2013.01); *H04W 12/06* (2013.01); *H04W 48/14* (2013.01); *H04W 84/12* (2013.01)

(58) Field of Classification Search
CPC ..... H04W 84/12; H04W 48/16; H04W 12/06; H04W 48/14; H04W 8/005; H04W 48/18;
(Continued)

(56) References Cited

U.S. PATENT DOCUMENTS

2012/0076118 A1    3/2012  Montemurro et al.
2013/0034023 A1*   2/2013  Jung ................. H04L 67/104
                                                    370/255
(Continued)

OTHER PUBLICATIONS

Funk, P., et al., Extensible Authentication Protocol Tunneled Transport Layer Security Authenticated Protocol Version 1 (EAP-TTLSv0), Network Working Group RFC 5281, Aug. 2008; 51 pages.

(Continued)

*Primary Examiner* — Olumide T Ajibade Akonai
(74) *Attorney, Agent, or Firm* — Patterson + Sheridan, LLP

(57) ABSTRACT

An example method is provided in one example embodiment and may include requesting, by a user equipment (UE), a profile associated with a subscriber that provides information to facilitate automatic association of the UE with one or more access points of a wireless network, wherein the requesting includes requesting the profile using a Generic Advertisement Service (GAS) Initial Request frame; and sending the profile to the UE using a GAS Initial Response frame. The method can include configuring a Vendor Specific Information Element (VSIE) within an Advertisement Protocol Identifier for the GAS Initial Request frame and configuring the VSIE to indicate an Access Network Query Protocol (ANQP) query for the profile. The method can also include configuring another VSIE within an Advertisement Protocol Identifier for the GAS Initial Response frame and configuring the VSIE to indicate an ANQP query response including the profile.

18 Claims, 7 Drawing Sheets

(51) Int. Cl.
  *H04W 48/14*   (2009.01)
  *H04W 8/18*    (2009.01)
  *H04W 84/12*   (2009.01)

(58) Field of Classification Search
  CPC ... H04W 76/023; H04W 88/06; H04W 48/08; H04W 48/20; H04W 12/08; H04W 76/021; H04W 88/08; H04W 76/02; H04W 36/0016; H04W 60/00; H04L 67/16; H04L 63/083; H04M 2250/06
  See application file for complete search history.

(56) References Cited

U.S. PATENT DOCUMENTS

| | | | |
|---|---|---|---|
| 2014/0185598 A1* | 7/2014 | Canpolat | H04W 48/16 370/338 |
| 2014/0254364 A1* | 9/2014 | Xiang | H04W 48/06 370/232 |
| 2014/0254454 A1* | 9/2014 | Calcev | H04W 48/20 370/312 |
| 2014/0293978 A1* | 10/2014 | Yang | H04W 8/005 370/338 |
| 2014/0355523 A1* | 12/2014 | Congdon | H04W 76/10 370/328 |
| 2016/0006739 A1 | 1/2016 | Huang et al. | |
| 2016/0088591 A1* | 3/2016 | Kim | H04W 72/04 370/338 |
| 2016/0219463 A1* | 7/2016 | Mestanov | H04W 28/08 |
| 2016/0381718 A1* | 12/2016 | Ahuja | H04W 12/06 370/338 |
| 2017/0180357 A1* | 6/2017 | Ghosh | H04L 63/0853 |

OTHER PUBLICATIONS

"Generic Advertisement Service," from Wikipedia, the free encyclopedia, Mar. 2, 2015; 2 pages.

"GSMA Recommendations for Minimal Wi-Fi Capabilities of Terminals, Version 2.0," GSM Association, Official Document TS.22—Recommendations for Minimal Wi-Fi Capabilities of Terminals, Sep. 20, 2013; 46 pages.

Gupta, Vishal, et al., "Information Embedding in IEEE 802.11 Beacon Frame," National Conference on Communication Technologies & its Impact on Next Generational Computing CTNGC 2012, Oct. 20, 2012, ITS, Mohan Nagar, Ghaziabad; 16 pages.

"Hotspot 2.0 (Release 2) Online Sign-Up Certificate Policy Specification, Version 1.1," Wi-Fi Alliance, Feb. 3, 2015; 20 pages.

"Hotspot 2.0 (Release 2) Technical Specification, Version 1.1.0," Wi-Fi Alliance, Feb. 3, 2015; 207 pages.

Cisco Systems, Inc., "Chapter: Service Provider WiFi: Support for Integrated Ethernet Over GRE," Intelligent Wireless Access Gateway Configuration Guide, Aug. 2, 2015; 13 pages.

Cisco Systems, Inc., "Configuring a Cisco Wireless Services Module and Wireless Control System," Apr. 8, 2009; 64 pages.

Cisco Systems, Inc., "Service Provider Wi-Fi Networks: Scaling Signaling Transactions," White Paper, Mar. 2014; 20 pages.

\* cited by examiner

100

300

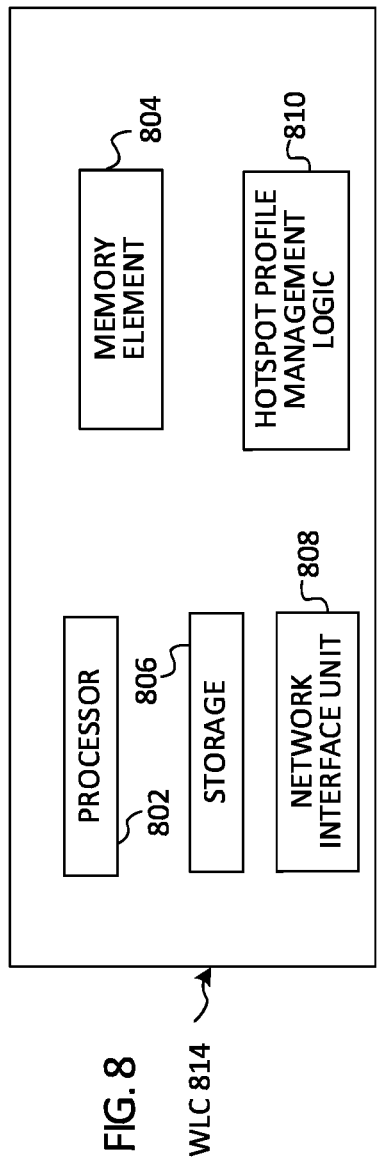

SYSTEM AND METHOD TO FACILITATE HOTSPOT ONBOARDING FOR USER EQUIPMENT IN A NETWORK ENVIRONMENT

CROSS-REFERENCE TO RELATED APPLICATION

This application claims the benefit of priority under 35 U.S.C. § 119(e) to U.S. Provisional Application Ser. No. 62/292,710, entitled "SYSTEM AND METHOD TO FACILITATE IMPROVED HOTSPOT 2.0 ONBOARDING FOR USER EQUIPMENT IN A NETWORK ENVIRONMENT," filed Feb. 8, 2016, which is hereby incorporated by reference in its entirety.

TECHNICAL FIELD

This disclosure relates in general to the field of communications and, more particularly, to a system and method to facilitate Hotspot onboarding for user equipment in a network environment.

BACKGROUND

Networking architectures have grown increasingly complex in communication environments. In particular, the Wi-Fi Alliance has introduced the Hotspot (HS) 2.0 initiative to improve user experience and provide seamless connectivity for Wi-Fi deployments. To provide for a seamless user experience, a Hotspot profile is downloaded to a subscriber's (e.g., user's) user equipment (UE) that enables the UE to automatically re-associate with Wi-Fi access points (APs) belonging to a service provider and/or enterprise Hotspot 2.0 network. For current deployments, a subscriber can participate in a HS 2.0 network by completing an onboarding process in which a username (UN) and password (PW) for the subscriber is stored in the network and used to populate a profile that can be downloaded to the subscriber's UE upon initial connection of the UE to a Wi-Fi AP of the Hotspot 2.0 network. The profile typically consists of end user credentials such as Username and Password and a set of parameters as defined by the HS 2.0 specification to allow the end user device to automatically get associated to the best available Wi-Fi hotspot at a venue. An onboarding process is required to establish the profile on the end user device. However, current onboarding processes are not standardized and can vary between operators. The lack of a standardized onboarding process has limited the adoption of Hotspot deployments. Accordingly, there is a need to provide improved Hotspot 2.0 onboarding for user equipment in a network environment.

BRIEF DESCRIPTION OF THE DRAWINGS

To provide a more complete understanding of the present disclosure and features and advantages thereof, reference is made to the following detailed description, taken in conjunction with the accompanying figures, wherein like reference numerals represent like parts, in which:

FIGS. 6-8 are simplified block diagrams illustrating example details that can be associated with various potential embodiments of the present disclosure.

DETAILED DESCRIPTION OF EXAMPLE EMBODIMENTS

Overview

Figure 1:
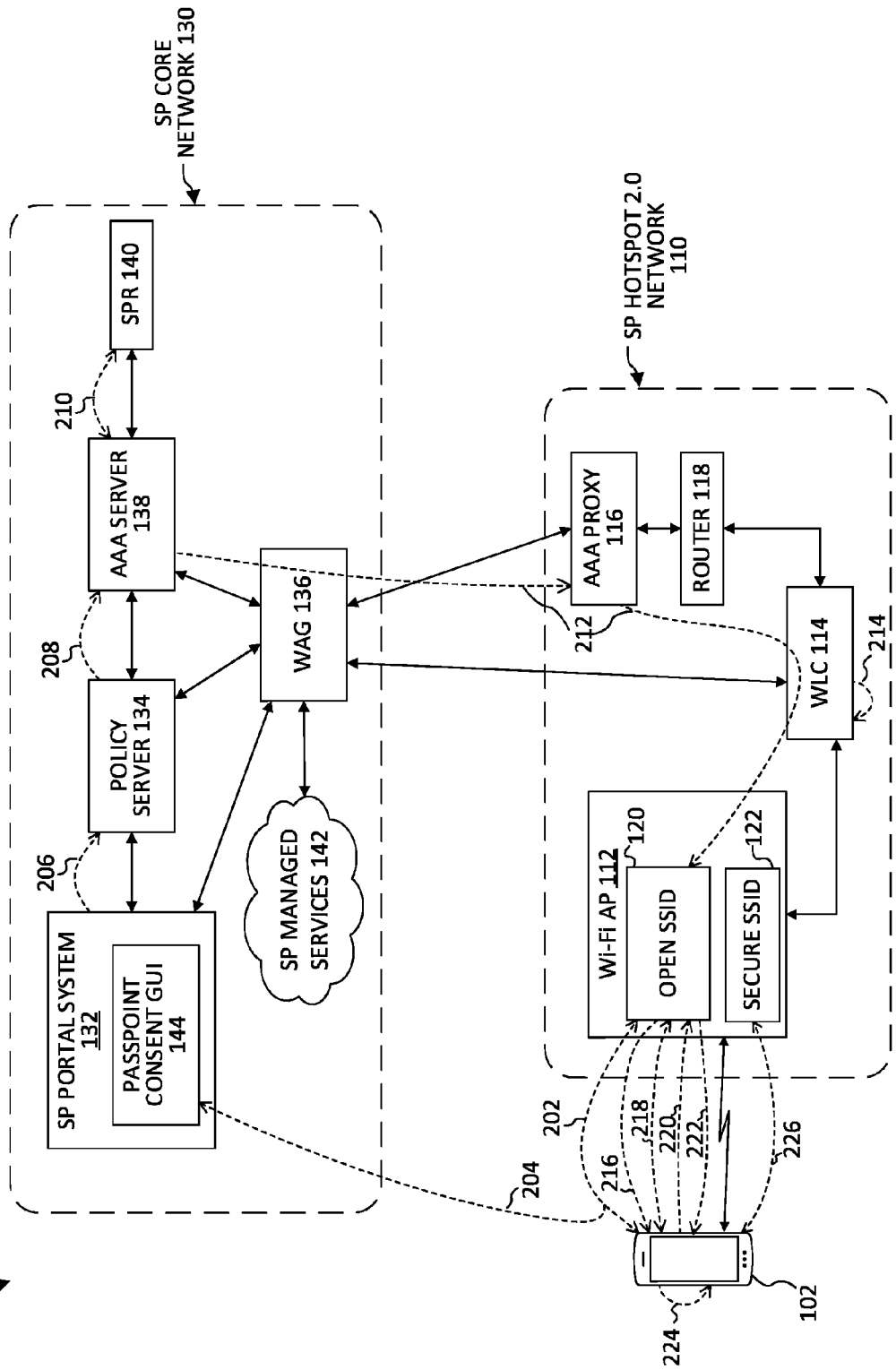
FIG. 1 is a simplified block diagram illustrating a communication system to facilitate Hotspot onboarding for user equipment in a network environment according to one embodiment of the present disclosure.

A method is provided in one example embodiment and may include requesting, by a user equipment (UE), a profile associated with a subscriber that provides information to facilitate automatic association of the UE with one or more access points of a wireless network, wherein the requesting includes requesting the profile using a Generic Advertisement Service (GAS) Initial Request frame; and sending the profile to the UE using a GAS Initial Response frame. The method can include configuring a Vendor Specific Information Element (VSIE) within an Advertisement Protocol Identifier for the GAS Initial Request frame and configuring the VSIE to indicate an Access Network Query Protocol (ANQP) query for the profile. The method can also include configuring a Vendor Specific Information Element (VSIE) within an Advertisement Protocol Identifier for the GAS Initial Response frame and configuring the VSIE to indicate an Access Network Query Protocol (ANQP) query response including the profile. The method can further include inserting a username and a password for the subscriber into the profile. The requesting by the UE can be initiated by a Wi-Fi access point of a Hotspot 2.0 network.

In some cases, the method can further include updating the profile in response to a change in at least one of a username of the subscriber and a password of the subscriber; and sending the updated profile to the UE using a GAS Initial Response frame. In various instances, the wireless network can be associated with at least one of a service provider network; and an enterprise network.

Example Embodiments

For purposes of understanding certain embodiments of systems and methods disclosed herein, it is important to appreciate the technologies and data that may be associated with network communications. The following foundational information may be viewed as a basis from which the present disclosure may be properly explained.

The original intent of the Hotspot (HS) 2.0 initiative by the Wi-Fi Alliance and the corresponding specifications and certification programs (e.g., Passpoint™) was to significantly improve end user experience and make an end user's experience as seamless as possible when connected to HS 2.0 networks. To provide for a seamless user experience, a Hotspot profile is downloaded to a subscriber's (e.g., end user's) user equipment (UE) that enables the UE to automatically re-associate with Wi-Fi access points (APs) belonging to a service provider or enterprise Hotspot 2.0 network. Without automatic re-association, an end user needs to manually select a hotspot Service Set Identifier (SSID) and would typically need to manually enter a username and password each time the end user was within range of connecting to a new Wi-Fi AP. Thus, the automatic re-association features of Hotspot 2.0 networks can significantly improve user experience.

In general, a Hotspot profile for a given Hotspot 2.0 network can include a username (UN) and a password (PW) for a subscriber, a Root certificate for the Hotspot 2.0 network and other parameters associated with the network including, but not limited to: Quality of Service (QoS) information, subscription information, network accounting, authentication and/or authorization information, other network parameters, combinations thereof or the like. As referred to herein in this Specification, a subscriber's username and password and/or a client certificate can generally be referred to as 'credentials', which can be used to authenticate and associate the subscriber's UE in a Wi-Fi access network.

In current Hotspot deployments, a subscriber desiring to participate in a Hotspot 2.0 network can complete an onboarding process in which the subscriber's UN and PW can be stored in the network and used to populate a profile that can be downloaded to the subscriber's UE upon initial connection of the UE to a Wi-Fi AP of the Hotspot 2.0 network. The profile stored on the UE can then be accessed as the subscriber moves among Wi-Fi APs of the Hotspot 2.0 network in order to re-associate the subscriber/UE with each Wi-Fi AP that the subscriber/UE may encounter in the network.

Unfortunately, UE onboarding processes are still very cumbersome in current Hotspot deployments. Passpoint Release 1.0 is currently the predominant Release supported by UE vendors for Hotspot networks. However, the Passpoint Release 1.0 specification does not provide a standardized onboarding solution; therefore, it is up to operators and service providers to implement mechanisms to download a HS 2.0 profile and the credentials into a UE. One current mechanism involves redirecting a user to a portal where the user signs up for the service. The user is then redirected to a link to download their profile onto their UE. Once downloaded, the user has to manually activate on the UE by installing the profile. Rather than downloading the profile, one option may include emailing the profile to the user/UE but this also requires the user to manually install the profile and could impose security risks to the user/UE. Another option may include relying on Mobile Device Management solutions to install a profile to a UE. Passpoint Release 2 specifications include a standards-based approach for online service sign-up. However, this is primarily meant for new end user customers to sign up for service provider (SP) Wi-Fi network services and, during the process, allows the download of profile and credentials to a customer's UE. None of the standards-based approach nor the other approaches involve a standardized profile download that occurs seamlessly to a user. In order to accelerate the adoption of Passpoint in the industry there is a need to significantly improve the service onboarding process for end user UE devices.

Any new solution for improving the Hotspot 2.0 onboarding should take into consideration the following: a new solution should support Passpoint profile download and credential establishment on UEs of existing subscribers of a service provider Wi-Fi access network(s) in which the service provider desires to upgrade their Wi-Fi access network(s) to Passpoint; a new solution should support Hotspot 2.0 Passpoint Profile download and credential establishment on UEs of employees of an Enterprise that desires to upgrade their Wi-Fi access networks to Passpoint; if a client certificate and/or username/password based authentication approach such as EAP-TLS (Extensible Authentication Protocol-Transport Layer Security), as defined in Internet Engineering Task Force (IETF) Request For Comments (RFC) 5216, or EAP-TTLS (EAP-Tunneled TLS), as defined in IETF RFC 5281, is adopted by a SP or Enterprise for a Hotspot 2.0 Passpoint deployment, the new solution should provide a mechanism to dynamically synchronize credentials for a subscriber or employee to the subscriber's or employee's UE device every time the subscriber or employee changes their network access credential(s); and a new solution should automate the onboarding process as much as possible so that minimum or no subscriber interaction is needed for profile download, profile update, credential refresh, etc.

In accordance with various embodiments, systems and methods discussed herein provide a solution to simplify and improve end user UE onboarding processes for Passpoint deployments. The solution discussed for various embodiments provided herein can be used to enhance features introduced in the Hotspot (HS) 2.0 framework as defined in Passpoint specifications. In various embodiments, the solutions provided by the systems and methods discussed herein can provide for simplifying and automating HS 2.0 profile and credential downloads, including certificates and/or other network parameters into UE.

Referring to FIG. 1, FIG. 1 is a simplified block diagram illustrating a communication system 100 to facilitate improved Hotspot (HS) 2.0 onboarding procedures for UE in a network environment according to one potential embodiment of the present disclosure. In particular, communication system 100 can be associated with a service provider (SP) network environment in which improved HS 2.0 onboarding procedures can be provided for UE in accordance with one embodiment. Communication system 100 can include users operating one or more user equipment (UE) 102, a service provider (SP) Hotspot 2.0 network 110 and a SP core network 130.

SP Hotspot 2.0 network 110 can include a Wi-Fi AP 112, a Wireless Local Area Network (LAN) Controller (WLC) 114, an authentication, authorization and accounting (AAA) proxy 116 and a router 118. Wi-Fi AP 112 can be configured with at least one open Service Set Identifier (SSID) 120 to which a Wi-Fi device (e.g., UE 102) can attach to perform one or more operations over an unsecured connection and at least one secure SSID 122 to which a Wi-Fi device can attach to perform one or more operations over a secured connection. In at least one embodiment, an SSID can be a maximum 32 octets in length and can identify a service set for the Wi-Fi AP. SP core network 130 can include an SP portal system 132, a policy server 134, a Wireless Access Gateway (WAG) 136, an AAA server 138, a subscriber profile repository (SPR) 140 and SP managed services 142. SP portal system 132 can be a server or other computing device, which can be configured to provide a Passpoint consent Graphical User Interface (GUI) 144 via a web page, pop-up or other GUI which can receive inputs from a user and/or provide information and/or prompts to the user.

UE 102 can interface with Wi-Fi AP 112 via an over-the-air (OTA) communication link. Wi-Fi AP 112 can further interface with WLC 114, which can further interface with router 118, and WAG 136. Router 118 can interface with AAA proxy 116, which can also interface with WAG 136. In various embodiments, WAG 136 may provide tunnel termination services for Internet Protocol (IP) version 4 (IPv4) and/or IP version 6 (IPv6) Generic Routing Encapsulation (GRE), including Ethernet over GRE (EoGRE), access tunnels between SP core network 130 and SP Hotspot 2.0 network 110 and/or can manage subscriber sessions between SP core network 130 and SP Hotspot 2.0 network 110. In addition to being a tunnel termination point for a wireless local area network (WLAN) (e.g., SP Hotspot 2.0 network 110), WAG 136 can also serve as a subscriber policy enforcement point for wireless subscribers. WAG 136 can further interface with SP managed services 142, SP portal system 132, policy server 134 and AAA server 138. Policy server 134 can further interface with SP portal system 132 and AAA server 138. AAA server 138 can further interface with SPR 140. In at least one embodiment, WAG 136 can interact with policy server 134 and/or AAA server 138 to apply Quality of Service (QoS) policies, other access restrictions and/or special traffic treatments for Wi-Fi subscribers.

Each of the elements, nodes, computing devices and/or systems discussed for various embodiments described herein can couple to one another through simple interfaces (as illustrated) or through any other suitable connection (wired or wireless), which provides a viable pathway for network communications. Additionally, any one or more of these computing devices, elements, nodes and/or systems may be combined or removed from a given deployment based on particular configuration needs. Communications in a network environment are referred to herein as 'messages', 'messaging' and/or 'signaling', which may be inclusive of communications using packets.

As discussed herein in this Specification, a packet or frame is a formatted unit of data that can contain both control information (e.g., source and destination address, etc.) and data, which is also known as payload. In some embodiments, control information can be included in headers and trailers for packets or frames. Packets or frames, generally referred to herein as messages, can be sent and received according to any suitable communication messaging protocols. Suitable communication messaging protocols can include a multi-layered scheme such as the Open Systems Interconnection (OSI) Model, or any derivations or variants thereof. The terms 'data', 'information' and 'parameters' as used herein can refer to any type of binary, numeric, voice, video, textual or script data or information or any type of source or object code, or any other suitable data or information in any appropriate format that can be communicated from one point to another in electronic devices and/or networks. Additionally, frames, messages, requests, responses, replies, queries, etc. are forms of network traffic and, therefore, may comprise one or more packets.

During operation, in at least one embodiment, Vendor Specific Information Elements (VSIE), as defined in the Institute of Electrical and Electronic Engineers (IEEE) 802.11u specification, are used to push profiles and certificates over the 802.11 networks dynamically to UE 102, to enroll or onboard the UE 102 in HS 2.0 networks. As prescribed by the IEEE 802.11u specification, 802.11u supports automated network discovery and selection features for Passpoint enabled networks by compatible UE as part of a Generic Advertisement Service (GAS) transport framework. The GAS transport framework defines messaging that can be exchanged between network elements (e.g., UE and Wi-Fi APs of HS 2.0 networks) to support the automated network discovery and selection features. The GAS framework does not limit the exchange of GAS messages after a device has been successfully associated with a Wi-Fi network.

Accordingly, systems and methods discussed for the various embodiments described herein can leverage VSIE, as described in IEEE 802.11u, using the GAS messaging transport framework to push a HS 2.0 profile to a UE that seeking to connect to a HS 2.0 network in order to onboard the UE to the network. In particular, the GAS transport framework can be used to transport Access Network Query Transport Protocol (ANQP) messages to facilitate messaging exchanges between a given UE (e.g., UE 102) and a given Wi-Fi AP (e.g., Wi-Fi AP 112) and a WLC (e.g., WLC 114) to push a HS 2.0 profile to the UE.

In accordance with one embodiment, the solutions provided by the systems and methods described herein can push a profile to a given UE in a secured manner such that a secured communication link (e.g., via secured SSID 122) can be established between the UE and a given Wi-Fi AP for exchanging GAS messaging. In accordance with one embodiment, a secured communication link can be provided for a given UE without the UE having credentials already downloaded to support a secured framework for communications. During a provisioning (e.g., onboarding) phase between a given UE and a Wi-Fi AP of a Hotspot 2.0 network, an anonymous client Authentication and Key Management (AKM) procedure as discussed in Passpoint Release 2.0 can be leveraged to facilitate secure GAS messaging exchanges between the UE and the Wi-Fi AP in accordance with one potential embodiment. Alternatively, in another potential embodiment, a server certificate based authentication approach can be leveraged to build a secure tunnel that can facilitate secure GAS messaging exchanges between a UE and a Wi-Fi AP of a Hotspot 2.0 network.

In various embodiments, communication system 100 or any other communication system discussed herein can represent a series of points or nodes of interconnected communication paths (wired or wireless) for receiving and transmitting packets of information that propagate through the communication system. In various embodiments, communication system 100 or any other communication system discussed herein can be associated with and/or provided by a single network operator or service provider and/or multiple network operators or service providers. In various embodiments, communication system 100 or any other communication system discussed herein can include and/or overlap with, in whole or in part, one or more packet data networks (PDNs) (e.g., the internet, SP managed services 142). Communication system 100 or any other communication system discussed herein may offer communicative interfaces between various computing devices, elements, nodes and/or systems and may be any local area network (LAN), wireless local area network (WLAN), metropolitan area network (MAN), wide area network (WAN), virtual private network (VPN), Radio Access Network (RAN), virtual local area network (vLAN), enterprise network, Intranet, extranet, or any other appropriate architecture or system that facilitates communications in a network environment.

In various embodiments, communication system 100 or any other communication system discussed herein may implement user datagram protocol/Internet Protocol (UDP/IP) connections and/or transmission control protocol/IP (TCP/IP) communication language protocol in particular embodiments of the present disclosure. However, communication system 100 or any other communication system discussed herein can alternatively implement any other suitable communication protocol, interface and/or standard, proprietary and/or non-proprietary, for transmitting and receiving messages. Other protocols, interfaces and/or communication standards that can be used in communication system 100 or any other communication discussed herein can include 3GPP Diameter-based protocols, Remote Authentication Dial-In User Service (RADIUS) protocols, AAA signaling, terminal access controller access-control system (TACACS), TACACS+, Proxy Mobile IP version 6 (PMIPv6), Proxy Mobile IP version 4 (PMIPv4), Extensible Messaging and Presence Protocol (XMPP), GTP (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol, Simple Object Access Protocol (SOAP), SOAP over Hypertext Transfer Protocol (HTTP), Representational State Transfer (REST), combinations thereof or the like.

As referred to herein in this Specification, the terms 'user', 'subscriber', 'UE' and 'user/UE' can be used interchangeably. It should be understood that a user, or more particularly, a subscriber, can be associated with the operation of a corresponding UE for one or more voice and/or data sessions. In various embodiments, a subscriber associated with a given UE can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE.

In various embodiments, UE 102 or any other UE discussed herein can be associated with any users, subscribers, employees, clients, customers, electronic devices, etc. wishing to initiate a flow in communication system 100 via some network. In at least one embodiment, UE 102 or any other UE discussed herein is configured to facilitate simultaneous Wi-Fi connectivity and cellular connectivity within communication system 100. The terms 'user equipment', 'mobile node', 'mobile station' or 'mobile device' are inclusive of devices used to initiate a communication, such as a computer, an electronic device such as a parking meter, vending machine, appliance, Internet of Things (IoT) device, etc., a personal digital assistant (PDA), a laptop or electronic notebook, a cellular telephone, an i-Phone™, i-Pad™, a Google Droid™ phone, an IP phone, wearable electronic device or any other device, component, element, or object capable of initiating voice, audio, video, media, or data exchanges within communication system 100. UE 102 or any other UE discussed herein may also be inclusive of a suitable interface to a human user such as a microphone, a display, a keyboard, or other terminal equipment.

UE 102 or any other UE discussed herein may also be any device that seeks to initiate a communication on behalf of another entity or element such as a program, a database, or any other component, device, element, or object capable of initiating an exchange within communication system 100. In certain embodiments, UE 102 or any other UE discussed herein may have a bundled subscription for network access and application services (e.g., voice), etc. In one embodiment, once the access session is established, the user can register for application services as well, without additional authentication requirements. Within communication system 100 or any other communication system described herein, IP addresses (e.g., for UE or any other element) can be assigned using dynamic host configuration protocol (DHCP), Stateless Address Auto-configuration (SLAAC), during default bearer activation processes, etc., or any suitable variation thereof. IP addresses used within communication system 100 can include IPv4 and/or IPv6 IP addresses.

In general, SP Hotspot 2.0 network 110 may be any Hotspot network providing a communications interface between UE 102 and SP core network 130. Although only one Wi-Fi AP 112 is shown in SP Hotspot 2.0 network 110, it should be understood that multiple Wi-Fi APs can be deployed in the network to provide SP Wi-Fi coverage over a given geographic area. In general terms, Wi-Fi APs operate in an unlicensed spectrum to connect users to a network. For a service provider (SP) providing for operation of a mobile network, Wi-Fi APs can offer improvements to both coverage and capacity, which is particularly applicable to indoor networking environments where macro cell networks typically suffer coverage limitations. In various embodiments, Wi-Fi AP 112 can encompass wireless network appliances such as a Wi-Fi array and/or a wireless bridge (e.g., between networks sharing a same SSID and radio channel). In some embodiments, Wi-Fi AP 112 can connect to a router (e.g., router 118) to relay data between UE 102 and wired devices of SP Hotspot 2.0 network 110.

In various embodiments, WLC 114 may be responsible for system-wide wireless LAN functions for SP Hotspot network 110, such as, for example, providing security policies, intrusion prevention, Radio Frequency (RF) management, Quality of Service (QoS) capabilities, and/or mobility services. Router 118 and AAA proxy 116 can be any network appliance encompassing servers, switches, gateways, etc. operable to exchange information that facilitates or otherwise helps to facilitate various operations as described for various embodiments discussed herein. Further, AAA proxy 116 can be configured with functionality to interface with AAA server 138 to facilitate various operations as described for various embodiments discussed herein.

In general, SP core network 130 may provide a communications interface between UE 102, one or more elements of SP core network 130 and SP managed services 142 for one or more 3GPP and/or non-3GPP Radio Access Networks (RANs). In various embodiments, 3GPP access networks can include Global System for Mobile Communications (GSM) Enhanced Data Rates for GSM (EDGE) Radio Access Network (GERAN), Universal Mobile Telecommunication System (UMTS) Terrestrial Radio Access Network (UTRAN), generally referred to as 3rd Generation (3G), and/or a LTE access network such as Evolved-UTRAN (E-UTRAN), generally referred to as 4th Generation (4G), LTE/LTE-Advanced (LTE-A) and/or 5th Generation (5G) 3GPP access networks. In various embodiments, non-3GPP access networks can include wireless local area networks (WLANs), such as IEEE 802.11 networks, Worldwide Interoperability for Microwave Access (WiMAX) networks, Bluetooth™ networks, combinations thereof or the like.

In addition to the features described herein, policy server 134 may also decide policy control and/or charging activities to apply to UE for cellular services such as 2G, 3G and/or 4G/LTE-based and Wi-Fi services based on various policy charging and control (PCC) rules. In some embodiments, policy server 134 can be configured to use user subscription information as a basis for policy and charging control decisions. Subscription information may apply for both session-based and non-session based services. Additionally, in some embodiments, policy server 134 can determine PCC rules based on an application or service described to the policy server from an Application Function (not shown). In some embodiments, policy server 134 can be implemented as a Policy and Charging Rules Function (PCRF), as defined in 3GPP standards. In some embodiments, policy server may communicate PCC rules to one or more elements of SP managed services 142. In various embodiments, SP managed services 142 can provide one or more of: policy enforcement, charging services (online and/or offline), Voice over IP (VoIP) services, Voice over LTE (VoLTE) services, video services, audio services, multimedia services, Quality of Service (QoS) management, data generation, deep-packet inspection, intercept, combinations thereof or the like.

In addition to the features described herein, AAA server 138 is a network element responsible for accounting, authorization and authentication functions for UE in communication system 100. For AAA considerations, AAA server 138 may provide a mobile node IP address, accounting session identification (Acct-Session-ID) and other mobile node states in appropriate messaging (e.g., via access-Request/access-Response messages). Authentication refers to the process where an entity's identity is authenticated, typically by providing evidence that it holds a specific digital identity such as an identifier and the corresponding credentials. Authorization refers to the process in which it is determined whether a particular entity is authorized to perform a given activity, typically inherited from authentication when logging on to an application or service. Authorization may be determined based on a range of restrictions, for example time-of-day restrictions, or physical location restrictions, or restrictions against multiple accesses by the same entity or user. Accounting refers to the tracking of network resource consumption by users for the purpose of capacity and trend analysis, cost allocation, billing, etc. In addition, accounting can be used to record events such as authentication and authorization failures, and, in some embodiments, can include auditing functionality, which permits verifying the correctness of procedures carried out based on accounting data.

In addition to the features described herein, SPR 140 can contain subscriber/subscription related information such as, for example, username and password needed for subscription-based policies (e.g., Hotspot 2.0 access) and IP-connectivity access network (IP-CAN) bearer level PCC rules implemented by the policy server 134. In some embodiments, SPR 140 may be combined with or distributed across other databases in communication system 100. In some embodiments, SPR 140 can also provide subscription profile information for one or more Packet Data Network(s) (PDN(s)), which may include, but not be limited to a subscriber's allowed services; information on a subscriber's allowed QoS; a subscriber's charging related information (e.g., location information relevant for charging); and/or a subscriber category.

Figure 2:
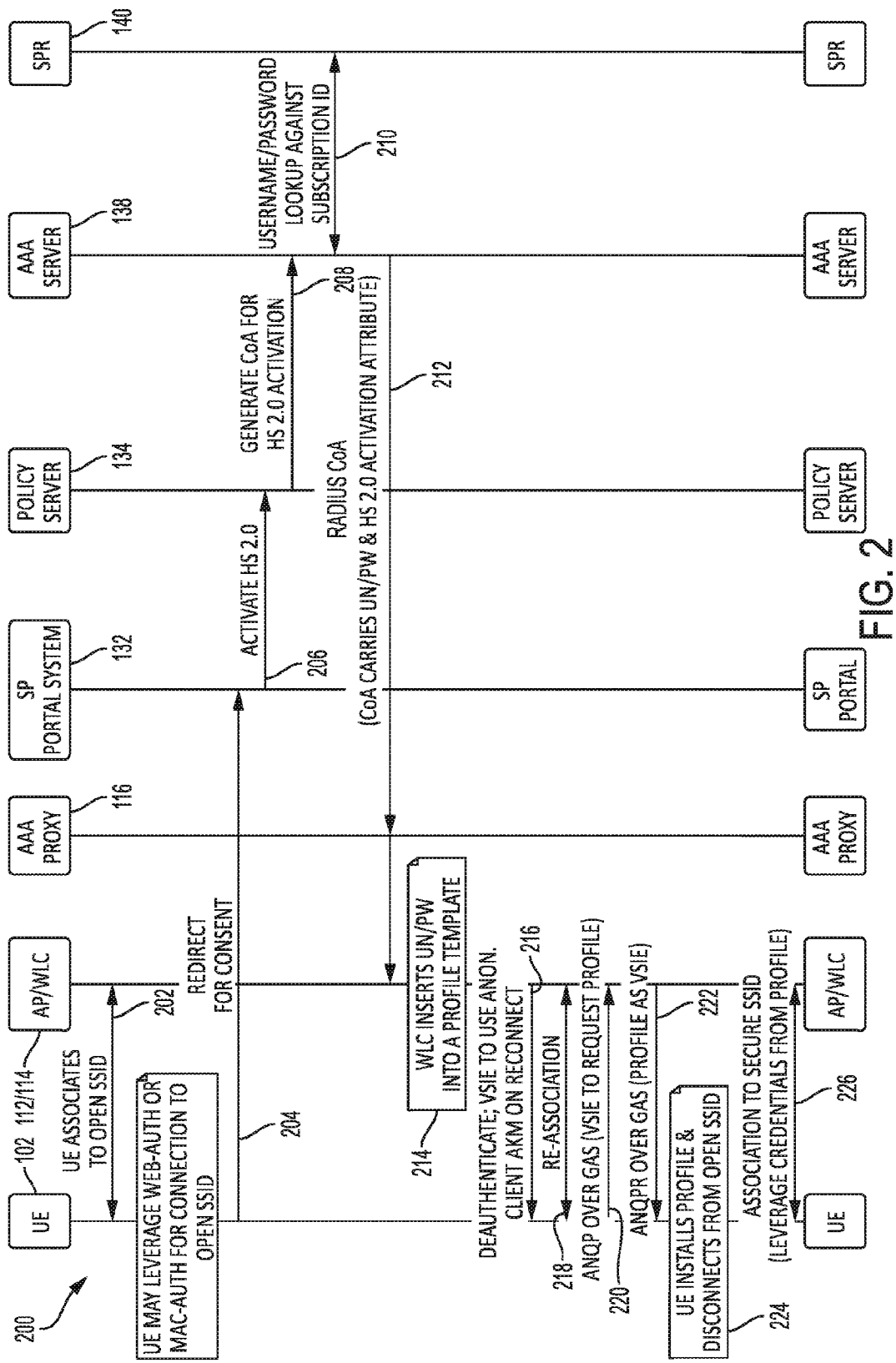
FIG. 2 is a simplified interaction diagram for an example call flow illustrating example interactions and operations that can be associated with the communication system of FIG. 1.

Referring to FIG. 2, FIG. 2 is a simplified interaction diagram 200 for an example call flow illustrating example details that can be associated with example interactions and operations to facilitate improved HS 2.0 onboarding for communication system 100 as shown in FIG. 1 in accordance with one potential embodiment of the present disclosure. FIG. 2 includes UE 102, Wi-Fi AP 112, WLC 114, AAA proxy 116, SP portal system 132, policy server 134, AAA server 138 and SPR 140. In some embodiments, Wi-Fi AP 112 and WLC 114 can share overlapping functionality such that Wi-Fi AP 112 and WLC 114 can be referred to for the present embodiment as AP/WLC 112/114. Thus, for various operations and/or interactions described in the embodiment of FIG. 2, Wi-Fi AP 112 and WLC 114 can be referred to separately or in combination (e.g., Wi-Fi AP/WLC 112/114). The interactions and operations discussed for the embodiment of FIG. 2 are illustrated in FIG. 1 via the dashed lines.

Beginning at 202, it is assumed that UE 102 is within the coverage area of Wi-Fi AP 112, does not have a Hotspot 2.0 profile installed and begins an 802.11 association procedure with the open SSID 120 of Wi-Fi AP 112. As prescribed by IEEE 802.11, association procedures carried out between a UE and Wi-Fi AP are used to establish an AP/UE mapping that enables UE invocation of system services. Association differs from authentication in that authentication generally refers to the process where an entity's identity is authenticated, typically by providing evidence that it holds a specific digital identity such as an identifier and corresponding credentials. Completion of UE association typically follows a successful authentication of the UE with a WiFi AP.

In various embodiments, UE 102 can leverage web authentication (WEB-AUTH) or Medium Access Control (MAC) authentication (MAC-AUTH) for connection to the open SSID. At 204, UE 102 is redirected to the SP portal system 132 for consent to access the SP Hotspot 2.0 network 110. Although not explicitly illustrated in FIG. 1, it should be understood that the redirect traverses WLC 114 and WAG 136 toward SP portal system 132. It is assumed for the embodiment of FIG. 2 that the user (e.g., subscriber) associated with UE 102 provides consent to participate in the Hotspot network via Passport consent GUI 144. In various embodiments, consent can be provided by a user checking a GUI box, entering one or more character(s), responding to a prompt, clicking a GUI button, combinations thereof or the like.

At 206, SP portal system 132 sends an indication of the consent to policy server 134 to activate Hotspot 2.0 access for the UE. The request can include the MAC address of the UE. At 208, the policy server performs a look-up on the UE MAC address and generates a RADIUS Change of Authorization (CoA) request for Hotspot 2.0 activation for the UE and sends the RADIUS CoA to AAA server 138. In general, a RADIUS CoA provides a mechanism through which the attributes of an AAA session can be changed after it is authenticated.

At 210, an exchange is performed with SPR 140 to perform a lookup of the username and password (UN/PW) for the subscriber associated with UE 102 against the subscription ID of the subscriber. In various embodiments, a subscription ID for a subscriber can include an IMSI or the like, which can be any unique identifier used by a service provider to identify a subscriber to track billing information and/or other Operational Support System (OSS)/Business Support System (BSS) to support end-to end services for UE.

For the embodiment of FIG. 2, it is assumed that the UN/PW look-up is successful for the subscriber associated with UE 102 (e.g., the subscriber/UE is authorized to access the Hotspot network). At 212, AAA server 138 generates a RADIUS CoA response including the UN/PW and a Hotspot 2.0 activation attribute and sends the RADIUS CoA to the AAA proxy 116 and AP/WLC 112/114. In at least one embodiment, a Hotspot activation attribute can be a Vendor Specific RADIUS Attribute that can be used to indicate to an AP/WLC that a given subscriber is undergoing Hotspot 2.0 service activation.

At 214, the WLC 114 inserts the UN/PW for subscriber/UE 102 into a profile template to generate a Hotspot 2.0 profile for UE 102. In various embodiments, a profile template can be configured to include a set of parameters common to a specific group (e.g., subscribers of a service provider or a subset of subscribers of a service provider) and can include parameters such as, but not limited to: Domain Name, Network Access Identifier (NAI) realm name, Roaming Consortium ID, etc. In at least one embodiment, operations at 214 can include WLC 114 determining an appropriate profile template for UE 102 based on one or more of the subscriber ID associated with the UE and/or one or more credentials for the UE and generating an appropriate Hotspot 2.0 profile for the UE including the UN/PW for the subscriber/UE and the set of parameters common to the group of subscribers to which the subscriber/UE belongs.

At 216, the AP/WLC 112/114 sends the UE 102 a Hotspot 2.0 deauthentication request including a Vendor Specific Information Element (VSIE) informing the UE to use an anonymous client AKM based authentication on reconnect in order to request the Hotspot 2.0 profile for UE 102 via ANQP at the time of re-association. The deauthentication request can include a vendor specific information field that can be used to tell the client (e.g., the UE) to initiate an anonymous client AKM based authentication on reconnect. In general, an anonymous client AKM based authentication can be used to provide authentication under an assumption that the client has not yet been provisioned by the credentials and allows only a server to authenticate itself to the client and to establish a secure channel with the client.

At 218, UE 102 performs a re-association with Wi-Fi AP 112 via open SSID 120. At 220, UE 102 requests its Hotspot 2.0 profile via AP/WLC 112/114 using a GAS Initial Request frame having a VSIE set to indicate an ANQP query for the Hotspot 2.0 profile for the UE. IEEE 802.11u standards define that a GAS Initial Request frame (e.g., message) can be sent by a requesting station (STA) to request information from another STA. A station can be a UE or a Wi-Fi AP. The GAS Initial Request frame is assumed to be a Public Action frame (e.g., not robust).

In at least one embodiment, a VSIE to request a Hotspot 2.0 profile for a UE can be carried in an Advertising Protocol element of a GAS Initial Request Frame. In general, the Advertisement Protocol element can include information that identifies a particular advertisement protocol and corresponding Advertisement Control. TABLE 1 illustrates the body format of a GAS Initial Request frame as defined in 802.11u.

TABLE 1

| Order | Information |
|---|---|
| 0 | Category |
| 1 | Action |
| 2 | Dialog Token |
| 3 | Advertisement Protocol element |
| 4 | Query Request Length |
| 5 | Query Request |

The Query Request field, as shown in TABLE 1, is a generic container that has a value set to a GAS query having a format based on the protocol indicated in the Advertising Protocol element. The Action field can be set to '10' to indicate a GAS Initial Request. TABLE 2 illustrates the format of an Advertisement Protocol element as defined in 802.11u, Section 7.3.2.93.

TABLE 2

| | Element ID | Length | Advertisement Protocol Tuple (APT) #1 | APT #2 (optional) | ... | APT #N (optional) |
|---|---|---|---|---|---|---|
| Octets | 1 | 1 | Variable | Variable | | Variable |

An APT can include a Query Response Info field having a length 1 octet and an Advertisement Protocol Identifier (ID) having a variable length. The Query Response Info field can include, at least in part, a 7-bit Query Response Length Limit indicating the maximum number of octets in which a STA can transmit in the Query Response field for one or more responses. TABLE 3 illustrates the format of an APT as defined in 802.11u.

TABLE 3

| | Query Response Info | Advertisement Protocol ID |
|---|---|---|
| Octets | 1 | Variable |

In at least one embodiment, APT #1 can include an Advertisement Protocol ID being set, in a first octet, to a value of 221 to indicate a vendor specific Advertisement Protocol ID such that remaining octets of the APT can include a VSIE. TABLE 4 illustrates an example VSIE as defined in 802.11u.

TABLE 4

| | Element ID | Length | OUI | Vendor-specific content |
|---|---|---|---|---|
| Octets | 1 | 1 | 3 | n − 3 |

The Element ID field of the VSIE can be set to a value of 221 to indicate a VSIE. The Length field can indicate the length of the APT, which should be 255 octets maximum. The Organization Unique Identifier (OUI) field can indicate a manufacturer, operator or vendor identity and the Vendor-specific content field(s) can be set to a value indicating an ANQP query for the Hotspot 2.0 profile for UE 102. In at least one embodiment, the Vendor-specific content fields can include an alphanumeric text string such as, for example, 'HS 2.0 Profile Request' that can be used to indicate an ANQP query for the profile. However, it should be understood that the example text string is only one example of the many inputs, strings, values, etc. that can be configured for the Vendor-specific content field(s); the field(s) provide for the flexibility to use any input, string, value, etc. within the constraints of the defined maximum length. In various embodiments, a UE can be informed and/or configured with a VSIE to use for HS profile requests by enhancing the HS 2.0 client (e.g., logic, software, etc.) installed on the UE. A HS 2.0 client can include logic, software, etc. that can enable a UE to perform operations, communications, etc. in a Hotspot 2.0 network environment. In various embodiments, a HS 2.0 client for UE can be enhanced to include one or more VSIEs to include in profile requests and/or other communications with a Hotspot enabled Wi-Fi AP/WLC.

Referring again to FIG. 2, at 222, AP/WLC 112/114 responds with a GAS Initial Response frame having a VSIE set to indicate an ANQP query response (ANQPR) including the Hotspot 2.0 profile for the UE. The GAS Initial Response frame can follow the formatting as prescribed by 802.11u in which the VSIE can be included in an Advertisement Protocol element for the GAS Initial Response frame. TABLE 5 illustrates the body format of a GAS Initial Response frame as defined in 802.11u.

TABLE 5

| Order | Information |
|---|---|
| 0 | Category |
| 1 | Action |
| 2 | Dialog Token |
| 3 | Status Code |

TABLE 5-continued

| Order | Information |
|---|---|
| 4 | GAS Comeback Delay |
| 5 | Advertisement Protocol Element |
| 6 | Query Request Length |
| 7 | Query Request |

The Action field can be set to '11' to indicate a GAS Initial Response. The Status Code field can be set to '0' to indicate a successful request. The Advertisement Protocol element and Advertisement Protocol ID for the GAS Initial Response can be formatted as shown in TABLES 2-4; however, the Advertisement Protocol ID for the GAS Initial Response can be configured with a VSIE set to indicate an ANQPR including the Hotspot 2.0 profile for the UE. At 224, UE 102 installs the Hotspot 2.0 profile and disconnects from the open SSID. At 226, UE 102 associates to the secure SSID 122 of Wi-Fi AP 112 leveraging the UN/PW credentials from the Hotspot 2.0 profile.

Accordingly, embodiments of communication system 100 can provide a system and method to dynamically push Hotspot profiles and credentials over the 802.11u GAS framework using ANQP in a service provider network environment.

Figure 3:
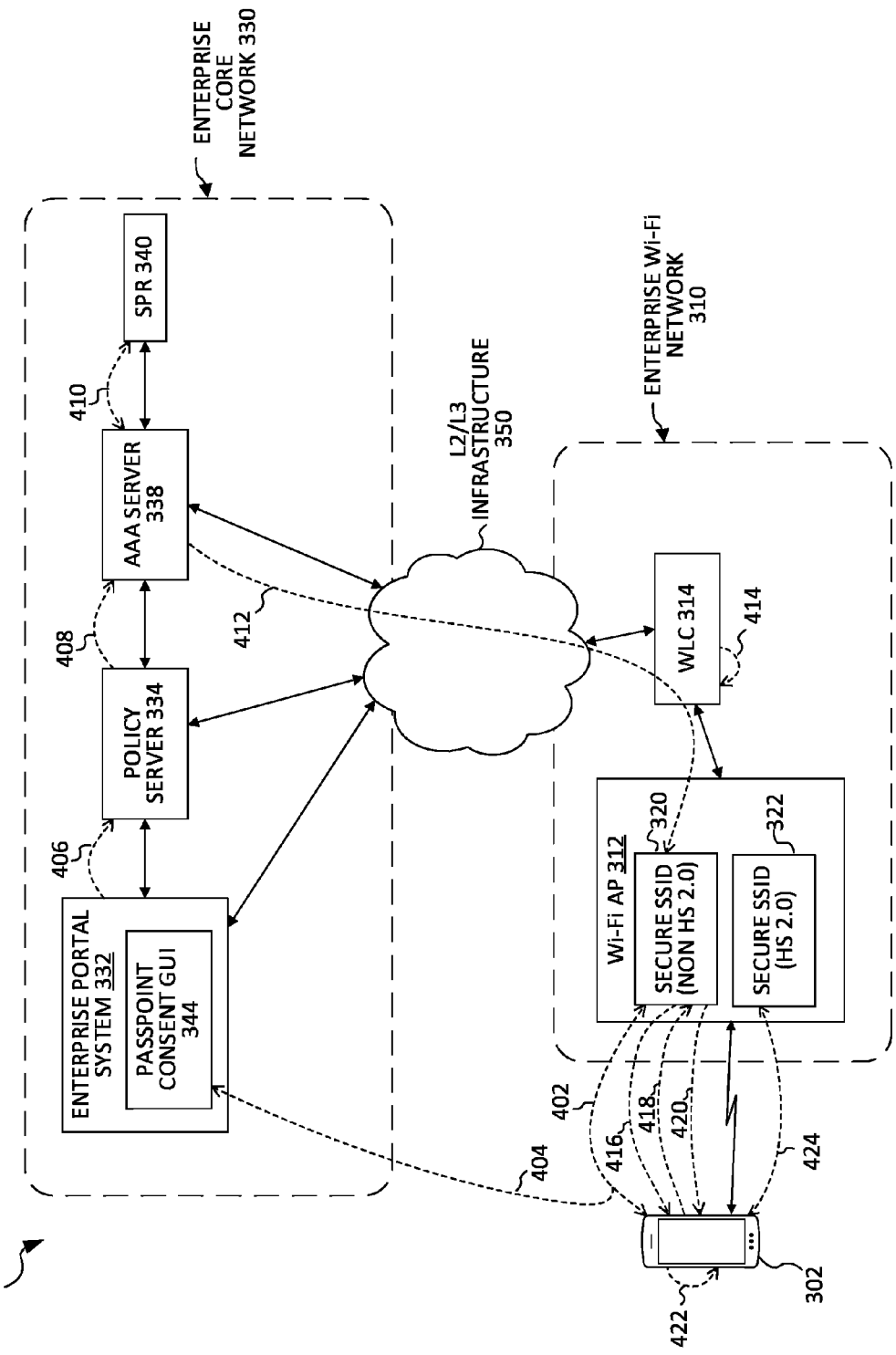
FIG. 3 is a simplified block diagram illustrating another communication system to facilitate Hotspot onboarding for user equipment in a network environment according to one embodiment of the present disclosure.

Referring to FIG. 3, FIG. 3 is a simplified block diagram illustrating another communication system 300 to facilitate improved Hotspot (HS) 2.0 onboarding procedures for UE in a network environment according to one potential embodiment of the present disclosure. In particular, communication system 300 can be associated with an enterprise network environment in which improved HS 2.0 onboarding procedures can be provided for UE in accordance with one embodiment. Communication system 300 can include users operating one or more UE 302, an enterprise Wi-Fi network 310, an enterprise core network 330 and a Layer 2/Layer 3 (L2/L3) infrastructure 350, which may provide elements, nodes, interfaces, etc. to facilitate network communications among enterprise Wi-Fi network 310 and enterprise core network 330 for communication system 300.

Enterprise Wi-Fi network 310 can include a Wi-Fi AP 312 and a WLC 314. Wi-Fi AP 312 can be configured with at least one secured SSID 320 that is not configured with Hotspot 2.0 capability and at least one secured SSID 322 that is configured with Hotspot 2.0 capability; thus, enterprise Wi-Fi network 310 can be configured to support Hotspot 2.0 capabilities. Enterprise core network 330 can include an enterprise portal system 332, a policy server 334, an AAA server 338 and an SPR 340. Enterprise portal system 332 can be configured to provide a Passpoint consent GUI 344 via a web page, pop-up or other GUI which can receive inputs from a user and/or provide information and/or prompts to the user.

UE 302 can interface with Wi-Fi AP 312 via an OTA communication link. Wi-Fi AP 312 can interface with WLC 314, which can interface with one or more elements, nodes, etc. of enterprise core network 330 via L2/L3 infrastructure 350. Enterprise portal system 332 can interface with policy server 334, which can further interface with AAA server 338. AAA server can further interface with SPR 340.

WLC 314 can be configured with functionality similar to WLC 114 as shown in the embodiment of FIG. 1 except that WLC 314 may be configured to facilitate enterprise operations for the enterprise deployment shown in the embodiment of FIG. 3. Enterprise portal system 332 and Passpoint consent GUI 344 can be configured with functionality similar to SP portal system 132 and Passpoint consent GUI 144 as shown in the embodiment of FIG. 1 except that they may be configured to facilitate enterprise operations for the enterprise deployment as shown in the embodiment of FIG. 3. Further, policy server 334, AAA server 338 and SPR 340 can be configured with functionality similar to policy server 134, AAA server 138 and SPR 140, respectively, as shown in the embodiment of FIG. 1 except that they may be configured to facilitate enterprise operations for the enterprise deployment shown in the embodiment of FIG. 3.

Interactions and operations associated with communication system 300 can be carried out similar to those described for the embodiment of FIG. 1 except that UE 302 is not requested to deauthenticate and re-associate with Wi-Fi AP/WLC 312/314 after the Hotspot 2.0 profile is populated for UE 302. Various interaction and operations associated with communication system 300 are described in further detail below with regard to FIG. 4.

Figure 4:
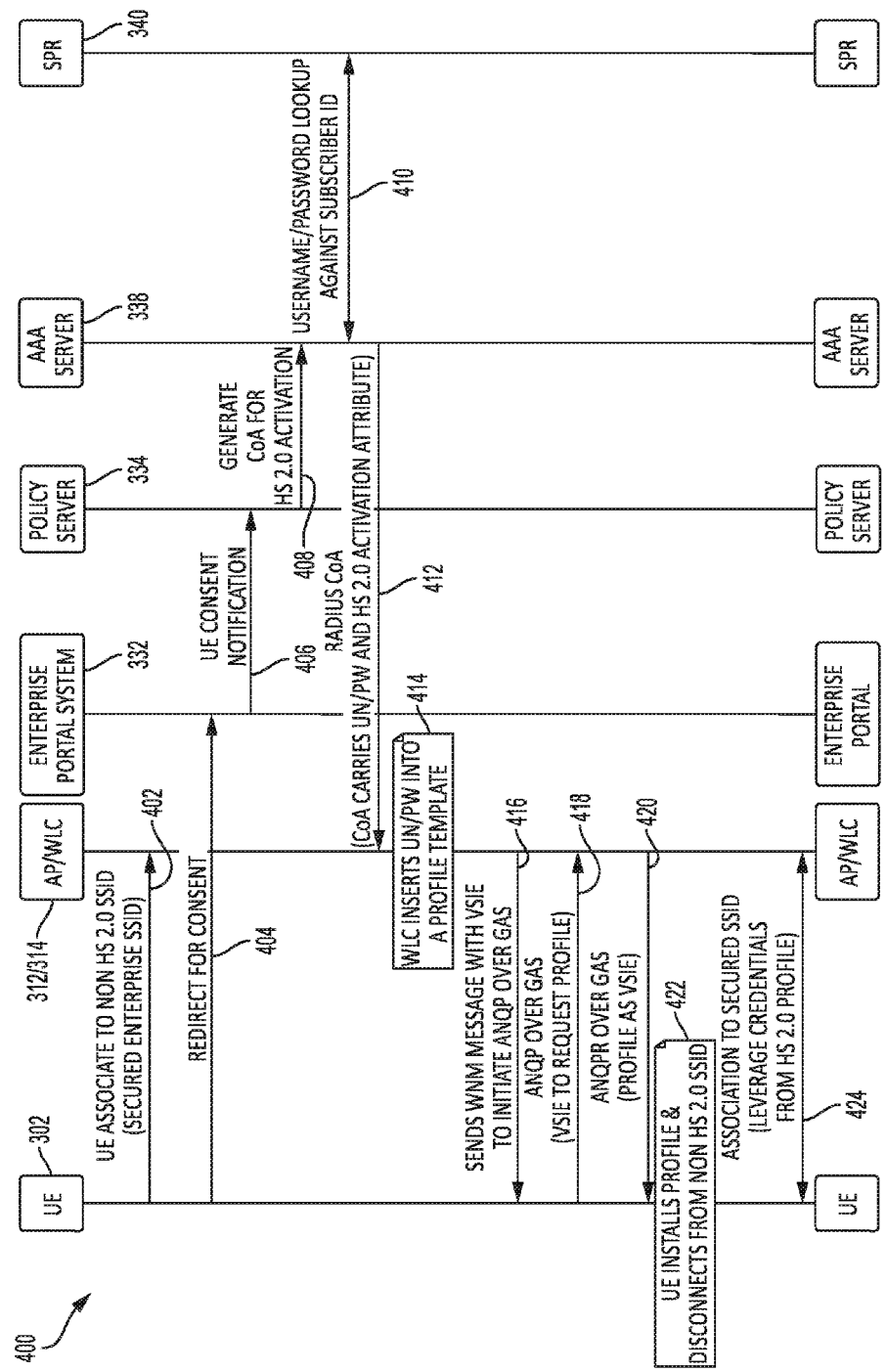
FIG. 4 is a simplified interaction diagram for an example call flow illustrating example interactions and operations that can be associated with the communication system of FIG. 3.

Referring to FIG. 4, FIG. 4 is a simplified interaction diagram 400 for an example call flow illustrating example details that can be associated with example interactions and operations to facilitate improved HS 2.0 onboarding for communication system 300 as shown in FIG. 3 in accordance with one potential embodiment of the present disclosure. FIG. 4 includes UE 302, Wi-Fi AP/WLC 312/314, enterprise portal system 332, policy server 334, AAA server 338 and SPR 340. For various operations and/or interactions described in the embodiment of FIG. 4, Wi-Fi AP 312 and WLC 314 can be referred to separately or in combination (e.g., Wi-Fi AP/WLC 312/314). The interactions and operations discussed for the embodiment of FIG. 4 are illustrated in FIG. 3 via the dashed lines.

Beginning at 402, it is assumed that UE 302 is within the coverage area of Wi-Fi AP 312, does not have a Hotspot 2.0 profile installed and begins an 802.11 association procedure with the non-Hotspot 2.0 secure SSID 320 of Wi-Fi AP 312. At 404, UE 302 is redirected to the enterprise portal system 332 for consent to access the Hotspot 2.0 capabilities of enterprise Wi-Fi network 310. Although not explicitly illustrated in FIG. 3, it should be understood that the redirect traverses WLC 314 and L2/L3 infrastructure 350 toward enterprise portal system 332. It is assumed for the embodiment of FIG. 3 that the subscriber associated with UE 302 provides consent to participate via the Hotspot capabilities of enterprise Wi-Fi network 310 via Passport consent GUI 344.

At 406, enterprise portal system 332 sends an indication of the consent to policy server 334 to activate Hotspot 2.0 access for the UE 302. The request can include the MAC address of the UE 302. At 408, the policy server performs a look-up on the UE MAC address and generates a RADIUS Change of Authorization (CoA) request for Hotspot 2.0 activation for the UE and sends the RADIUS CoA to AAA server 338. At 410, an exchange is performed with SPR 340 to perform a lookup of the username and password (UN/PW) for the subscriber associated with UE 302 against the subscription ID of the user. For the embodiment of FIG. 4, it is assumed that the UN/PW look-up is successful for the subscriber associated with UE 302 (e.g., the subscriber/UE is authorized to access the Hotspot network). At 412, AAA server 338 generates a RADIUS COA response including the UN/PW and a Hotspot 2.0 activation attribute and sends the RADIUS CoA to AP/WLC 312/314. At 414, the WLC 314 inserts the UN/PW for subscriber/UE 302 into a profile template to generate a Hotspot 2.0 profile for UE 302. In at least one embodiment, operations at 414 can include WLC 114 determining an appropriate profile template for UE 302 based on one or more of the subscriber ID associated with the UE and/or one or more credentials for the UE and generating an appropriate Hotspot 2.0 profile for the UE including the UN/PW for the subscriber/UE and the set of parameters common to the group of subscribers to which the subscriber/UE belongs.

At 416, AP 312 sends UE 302 a Wireless Network Management frame including a VSIE informing the UE 302 to initiate an ANQP query over GAS. In at least one embodiment, the Vendor-specific content fields can include an alphanumeric text string such as, for example, 'HS 2.0 Profile Request' that can be used to indicate an ANQP query for the profile. However, it should be understood that the example text string is only one example of the many inputs, strings, values, etc. that can be configured for the Vendor-specific content field(s); the field(s) provide for the flexibility to use any input, string, value, etc. within the constraints of the defined maximum length. At 418, UE 302 requests its Hotspot 2.0 profile via AP/WLC 312/314 using a GAS Initial Request having a VSIE set to indicate an ANQP query for the Hotspot 2.0 profile for the UE. The Request at 418 for the embodiment of FIG. 4 can follow the same formatting as described above for the request at 220 for the embodiment of FIG. 2. At 420, AP/WLC 312/314 responds with a GAS Initial Response frame having a VSIE set to indicate an ANQP query response including the Hotspot 2.0 profile for the UE. The GAS Initial Response frame can follow the formatting as prescribed by 802.11u in which the VSIE can be included in an Advertisement Protocol element for the GAS Initial Response frame. At 422, UE 302 installs the Hotspot 2.0 profile and disconnects from the non-Hotspot 2.0 secure SSID 320. At 424, UE 302 associates to the Hotspot 2.0 secure SSID 422 of Wi-Fi AP 312 leveraging the UN/PW credentials from the Hotspot 2.0 profile.

Accordingly, embodiments of communication system 300 can provide a system and method to dynamically push Hotspot profiles and credentials over the 802.11u GAS framework using ANQP in an enterprise network environment. Thus, according to various embodiments provided by the present disclosure, the systems and methods disclosed herein can provide solutions to dynamically push Hotspot profiles and credentials over the 802.11u GAS framework using ANQP. Further, the same mechanism can be used to refresh access credentials for Passpoint subscribers and allow password synchronization for subscribers who are existing customers or enterprise employees in certain embodiments.

Figure 5:
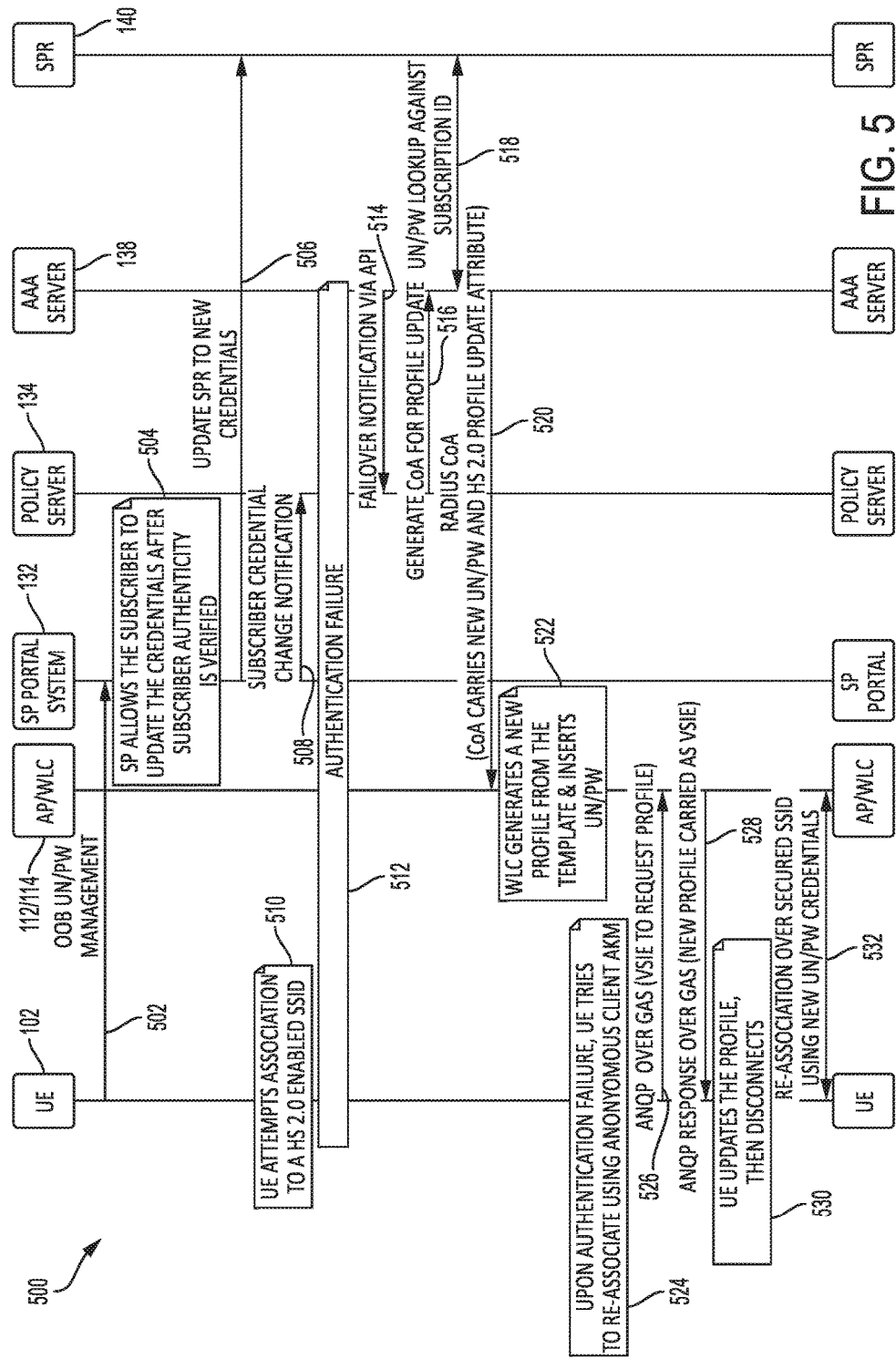
FIG. 5 is a simplified interaction diagram for another example call flow illustrating other example interactions and operations that can be associated the communication system of FIG. 1.

Referring to FIG. 5, FIG. 5 is a simplified interaction diagram 500 for another example call flow illustrating other example details that can be associated with example interactions and operations to facilitate improved HS 2.0 onboarding for communication system 100 as shown in FIG. 1 in accordance with one potential embodiment of the present disclosure. In particular, FIG. 5 illustrates example details associated with example interactions and operations that can be performed to facilitate updating the Hotspot 2.0 profile of UE 102 in the SP environment shown in FIG. 1. FIG. 5 includes UE 102, Wi-Fi AP 112, WLC 114, SP portal system 132, policy server 134, AAA server 138 and SPR 140. For various operations and/or interactions described in the embodiment of FIG. 5, Wi-Fi AP 112 and WLC 114 can be referred to separately or in combination (e.g., Wi-Fi AP/WLC 112/114).

At 502, it is assumed that the subscriber associated with UE 102 performs out of band (OOB) username and/or password (UN/PW) management via UE 102 and SP portal system 132 to update the UN/PW for the subscriber/UE. It further assumed at 502 that the subscriber/UE is not connected to the SP Hotspot 2.0 network 110 when the management is performed. At 504, it is assumed that the SP allows the subscriber to update their UN/PW credentials after the subscriber's authenticity is verified. At 506, the SP portal system 132 updates SPR 140 with the new UN/PW credentials for the subscriber. At 508, the SP portal system 132 sends a subscriber credential change notification to policy server.

At 510, it is assumed that UE 102 attempts an association to a Hotspot 2.0 enabled SSID for the service provider using an old profile stored on the UE. Because the credentials of the subscriber have been updated, however, authentication of the UE 102 fails at 512. At 514, AAA server 138 sends a failover notification of the authentication failure to policy server 134 via an Application Programming Interface (API) configured to provide such an indication to be sent from AAA server 138 and received by policy server 134.

Receiving the failover notification at policy server 134 can trigger the policy server to perform a look-up on the UE MAC address and generate a RADIUS CoA request for a Hotspot 2.0 profile update for the UE and to send the RADIUS CoA to AAA server 138 at 516. At 518, an exchange is performed with SPR 140 to perform a lookup of the UN and PW for the subscriber associated with UE 102 against the subscription ID of the subscriber. For the embodiment of FIG. 5, it is assumed that the UN and PW look-up is successful for the subscriber associated with UE 102 (e.g., the subscriber/UE is authorized to access the Hotspot network). At 520, AAA server 138 generates a RADIUS CoA response including the new UN/PW for the subscriber and a Hotspot 2.0 profile update attribute and sends the RADIUS CoA to the AAA proxy 116 and AP/WLC 112/114. In at least one embodiment, a Hotspot profile update attribute can be a Vendor Specific RADIUS Attribute that can be used to indicate to an AP/WLC that a given subscriber's profile needs to be updated. At 522, the WLC 114 generates a new profile from the profile template for UE 102 and inserts the new UN/PW for subscriber/UE 102 into the profile template to generate a new Hotspot 2.0 profile for UE 102.

Upon determining that the authentication has failed, the UE tries to re-associate to the Wi-Fi AP 112 using an anonymous client AKM based authentication at 524. The re-association is not shown in FIG. 5. At 526, UE 102 requests its Hotspot 2.0 profile via AP/WLC 112/114 using a GAS Initial Request having a VSIE set to indicate an ANQP query for the Hotspot 2.0 profile for the UE. The Request at 526 for the embodiment of FIG. 5 can follow the same formatting as described above for the request at 220 for the embodiment of FIG. 2. At 528, AP/WLC 112/114 responds with a GAS Initial Response frame having a VSIE set to indicate an ANQP query response including the new Hotspot 2.0 profile for the UE. The GAS Initial Response frame can follow the formatting as prescribed by 802.11u in which the VSIE can be included in an Advertisement Protocol element for the GAS Initial Response frame. At 530, UE 102 updates its stored Hotspot 2.0 profile and disconnects from the Wi-Fi AP 112. At 532, UE 102 associates to the secure SSID 122 of Wi-Fi AP 112 leveraging the new UN/PW credentials from the Hotspot 2.0 profile.

Accordingly, as illustrated in the embodiment of FIG. 5, a Hotspot 2.0 profile can be pushed to a subscriber's UE upon a change in the subscriber's credentials (e.g., UN and/or PW) using ANQP over the 802.11u GAS framework.

Figure 6:
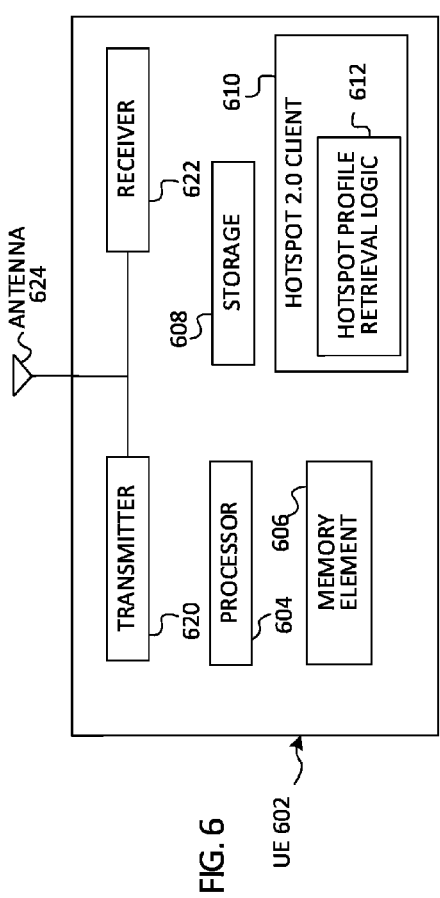

Referring to FIG. 6, FIG. 6 is a simplified block diagram illustrating example details that can be associated with a UE 602 in accordance with one potential embodiment. UE 602 can include at least one processor 604, at least one memory element 606, a storage 608, a Hotspot 2.0 client 610, at least one transmitter 620, at least one receiver 622 and at least one antenna 624. Hotspot 2.0 client 610 can be configured with Hotspot profile retrieval logic 612. In various embodiments, UE 602 can be used in a SP network environment (e.g., as UE 102 shown in FIG. 1) or can be used in an enterprise network environment (e.g., as UE 302 as shown in FIG. 3).

In at least one embodiment, at least one processor 604 is at least one hardware processor configured to execute various tasks, operations and/or functions of the UE as described herein. At least one memory element 606 and/or storage 608 can be configured to store data, information, software and/or instructions associated with the UE. For example, in various embodiments, at least one memory element 606 and/or storage 608 can be configured to store one or more SSID(s); one or more Basic Service Set Identifiers (BSSID(s)); one or more Extended Service Set Identifiers (ESSID(s)); one or more certificates; one or more usernames and/or passwords; one or more Hotspot 2.0 profile(s) for the subscriber associated with the UE (e.g., for different Hotspot networks); protocol frame configuration information (e.g., GAS, ANQP, WNM, etc.); VSIE configuration information; logic; any other data, information, software and/or instructions as discussed for various embodiments described herein (e.g., Hotspot 2.0 client 610 and/or Hotspot profile retrieval logic 612 can, in some embodiments, be stored in at least one memory element 606 and/or storage 608 in whole or in part), combinations thereof or the like.

In at least one embodiment, at least one transmitter 620, at least one receiver 622 and at least one antenna 624 can operate in combination and/or with one or more other elements of the UE to facilitate over the air communications with one or more Wi-Fi APs, RAN nodes, other UE or the like for various operations as described herein.

In at least one embodiment, Hotspot 2.0 client 610 including Hotspot profile retrieval logic 610 can be installed at the UE during onboarding. Hotspot 2.0 client 610 including Hotspot profile retrieval logic 612 can include instructions that, when executed (e.g., by at least one processor 604), cause the UE to perform one or more operations as discussed herein including, but not limited to: requesting a Hotspot 2.0 profile for the UE (e.g., a new or updated profile) using a GAS Initial Request having a VSIE set to indicate an ANQP query for the Hotspot 2.0 profile for the UE; installing the profile for the UE from a GAS Initial Response having a VSIE set to indicate an ANQP query response including the Hotspot 2.0 profile for the UE; combinations thereof or any other operations described for various embodiments discussed herein.

Figure 7:
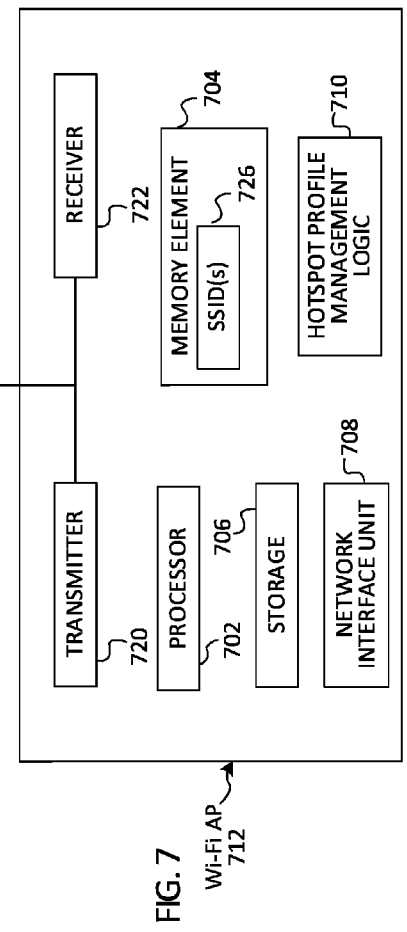

Referring to FIG. 7, FIG. 7 is a simplified block diagram illustrating example details that can be associated with a Wi-Fi AP 712 in accordance with one potential embodiment. Wi-Fi AP 712 can include at least one processor 702, at least one memory element 704, a storage 706, a network interface unit 708, Hotspot profile management logic 710, at least one transmitter 720, at least one receiver 722 and at least one antenna 724. At least one memory element 704 can be configured with one or more SSID(s) 726. In various embodiments, Wi-Fi AP 712 can be a Wi-Fi AP configured for a SP deployment (e.g., as Wi-Fi AP 112) or can be a Wi-Fi AP configured for an enterprise deployment (e.g., as Wi-Fi AP 312).

In at least one embodiment, at least one processor 702 is at least one hardware processor configured to execute various tasks, operations and/or functions of the Wi-Fi AP as described herein. At least one memory element 704 and/or storage 706 can be configured to store data, information, software and/or instructions associated with the Wi-Fi AP. Although one or more SSID(s) 726 are illustrated as being configured in at least one memory element 704, in some embodiments, SSID(s) can also be stored in storage 706. Further, although not shown, at least one memory element 704 and/or storage 706 can be configured to store: one or more BSSID(s), one or more ESSID(s), one or more Hotspot 2.0 profile template(s) (e.g., for different UE groups, for different service providers, for different enterprise networks, etc.); protocol frame configuration information (e.g., GAS, ANQP, WNM, etc.), VSIE configuration information, any other data, information, software and/or instructions as discussed for various embodiments described herein, combinations thereof or the like.

In at least one embodiment, at least one transmitter 720, at least one receiver 722 and at least one antenna 724 can operate in combination and/or with one or more other elements of Wi-Fi AP 712 to facilitate over the air communications with one or more UE for various operations as described herein. In various embodiments, network interface unit 708 enables communication between the Wi-Fi AP and a WLC for a given deployment. In some embodiments, network interface unit 708 can be configured with one or more Ethernet driver(s) and/or controller(s) or other similar network interface driver(s) and/or controller(s) to enable communications for the Wi-Fi AP.

In at least one embodiment, Hotspot profile management logic 710 can include instructions that, when executed (e.g., by at least one processor 702), cause the Wi-Fi AP to perform one or more operations as discussed herein including, but not limited to: sending a deauthentication to a given UE to reconnect using an anonymous client AKM based authentication in order to request a Hotpot 2.0 profile upon re-association; determining a Hotspot 2.0 profile template to use for a given UE; generating a Hotspot 2.0 profile for a given UE using a profile template determined for the UE; sending a GAS Initial Response having a VSIE set to indicate an ANQP query response including a Hotspot 2.0 profile for a given UE; combinations thereof or any other operations described for various embodiments discussed herein.

Referring to FIG. 8, FIG. 8 is a simplified block diagram illustrating example details that can be associated with a WLC 814 in accordance with one potential embodiment. WLC 814 can include at least one processor 802, at least one memory element 804, a storage 806, a network interface unit 808 and Hotspot profile management logic 810. In various embodiments, WLC 814 can be a WLC configured for a SP deployment (e.g., WLC 114) or can be a WLC configured for an enterprise deployment (e.g., WLC 314).

In at least one embodiment, at least one processor 802 is at least one hardware processor configured to execute various tasks, operations and/or functions of the WLC as described herein. At least one memory element 804 and/or storage 806 can be configured to store data, information, software and/or instructions associated with the WLC and/or one or more Wi-Fi APs. In various embodiments, operational functionality configured for the WLC and one or more Wi-Fi APs for a given deployment can overlap in whole or in part. In various embodiments, at least one memory element 804 and/or storage 606 can be configured to store: one or more SSID(s), one or more BSSID(s), one or more ESSID(s), a Hotspot 2.0 profile template; protocol frame configuration information (e.g., GAS, ANQP, WNM, etc.), VSIE configuration information, logic (e.g., Hotspot profile management logic 810), any other data, information, software and/or instructions as discussed for various embodiments described herein, combinations thereof or the like.

In various embodiments, network interface unit 808 enables communication between the WLC, one or more Wi-Fi APs, one or more core network elements and/or nodes and/or one or more enterprise elements and/or nodes for various deployments. In some embodiments, network interface unit 808 can be configured with one or more Ethernet driver(s) and/or controller(s) or other similar network interface driver(s) and/or controller(s) to enable communications for the WLC.

In at least one embodiment, Hotspot profile management logic 810 can include instructions that, when executed (e.g., by at least one processor 802), cause the WLC to perform, one or more operations discussed herein including, but not limited to: inserting username and password information into a new or updated Hotspot profile template for a given UE; managing configuration of one or more Wi-Fi APs; combinations thereof or any other operations described for various embodiments discussed herein.

In regards to the internal structure associated with communication system 100 and communication system 300 described herein, any UE, Wi-Fi AP, WLC, node, network element, controller, system and/or server can be configured to include a respective at least one processor and a respective at least one memory element in accordance with various embodiments. In addition, in some embodiments, storage can be configured for any such UE, Wi-Fi AP, WLC, node, element, controller, system and/or server. Hence, appropriate software, hardware and/or algorithms are being provisioned for communication system 100 and communication system 300 in order to facilitate operations as described for various embodiments discussed herein to facilitate Hotspot onboarding for user equipment in a network environment.

In one example implementation, UEs, Wi-Fi APs, WLCs, nodes, network elements, controllers, systems and/or servers discussed for various embodiments described herein can encompass network appliances, routers, switches, gateways, bridges, loadbalancers, firewalls, processors, modules, or any other suitable device, component, element, or object operable to exchange information that facilitates or otherwise helps to facilitate various operations as described for various embodiments discussed herein in a network environment (e.g., for networks such as those illustrated in FIGS. 1 and 3). Alternatively, one or more of the UEs, Wi-Fi APs, WLCs, nodes, network elements, controllers, systems and/or servers discussed herein can include software (or reciprocating software) that can coordinate in order to achieve operations associated with Hotspot onboarding for user equipment in a network environment, as outlined herein. In still other embodiments, one or more of the UEs, Wi-Fi APs, WLCs, nodes, network elements, controllers, systems and/or servers discussed herein may include any suitable algorithms, hardware, software, components, modules, clients, interfaces, and/or objects that facilitate the operations thereof. This may be inclusive of appropriate algorithms, communication protocols, interfaces and/or standards, proprietary and/or non-proprietary that allow for the effective exchange of data or information.

In various embodiments, the UEs, Wi-Fi APs, WLCs, nodes, network elements, controllers, systems and/or servers discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to the UEs, Wi-Fi APs, WLCs, nodes, network elements, controllers, systems and/or servers discussed herein could be provided in any database, register, control list, cache, and/or storage structure: all of which can be referenced at any suitable timeframe. Any such storage options may be included within the broad term 'memory element' as used herein. Similarly, any of the potential processing elements, controllers, managers, logic and/or machines described herein should be construed as being encompassed within the broad term 'processor'. Each of the UEs, Wi-Fi APs, WLCs, nodes, network elements, controllers, systems and/or servers discussed herein can also include suitable interfaces for receiving, transmitting, and/or otherwise communicating data or information in a network environment.

Note that in certain example implementations, operations as outlined herein to facilitate Hotspot onboarding of user equipment may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element [as shown in FIGS. 6-8] can store data, software, code, instructions (e.g., processor instructions), logic, parameters, combinations thereof or the like used for operations described herein. This includes memory elements being able to store data, software, code, instructions (e.g., processor instructions), logic, parameters, combinations thereof or the like that are executed to carry out operations described herein. A processor (e.g., a hardware processor) can execute any type of instructions associated with data to achieve the operations detailed herein. In one example, a processor [as shown in FIGS. 6-8] could transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Each of the UEs, Wi-Fi APs, WLCs, nodes, network elements, controllers, systems and/or servers discussed for various embodiments described herein can couple to one another through simple interfaces (as illustrated) or through any other suitable connection (wired or wireless), which provides a viable pathway for network communications. Additionally, any one or more of these UEs, Wi-Fi APs, WLCs, nodes, network elements, controllers, systems and/or servers discussed herein may be combined or removed from a given deployment based on particular configuration needs. Communications in a network environment are referred to herein as 'frames', 'messages', 'messaging' and/or 'signaling', which may be inclusive of communications using packets.

Note that in this Specification, references to various features (e.g., elements, structures, nodes, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a computer, processor, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 and communication system 300 (and their teachings) are readily scalable and can accommodate a large number of components, as well as more complicated/sophisticated arrangements and configurations. Accordingly, the examples provided should not limit the scope or inhibit the broad teachings of communication system 100 and communication system 300 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of' and 'one or more of can be represented using the'(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 and/or communication system 300 may be applicable to other exchanges or routing protocols, interfaces and/or communications standards, proprietary and/or non-proprietary. Moreover, although communication system 100 and communication system 300 have been illustrated with reference to particular elements and operations that facilitate the communication process, these elements, and operations may be replaced by any suitable architecture or process that achieves the intended functionality of communication system 100 and/or communication system 300.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   requesting, by a user equipment (UE), a profile associated with a subscriber, wherein the profile provides information to facilitate automatic association of the UE with one or more access points of a wireless network, wherein the requesting includes requesting the profile using a Generic Advertisement Service (GAS) Initial Request frame;
   determining a subscription identifier of the subscriber, based on a unique identifier of the UE;
   determining a username and a password for the subscriber, based on the determined subscription identifier; and
   sending the profile to the UE using a GAS Initial Response frame, wherein the profile comprises the username and the password for the subscriber.

2. The method of claim 1, further comprising:
   configuring a Vendor Specific Information Element (VSIE) within an Advertisement Protocol Identifier for the GAS Initial Request frame.

3. The method of claim 2, further comprising:
   configuring the VSIE to indicate an Access Network Query Protocol (ANQP) query for the profile.

4. The method of claim 1, further comprising:
configuring a Vendor Specific Information Element (VSIE) within an Advertisement Protocol Identifier for the GAS Initial Response frame.

5. The method of claim 4, further comprising:
configuring the VSIE to indicate an Access Network Query Protocol (ANQP) query response including the profile.

6. The method of claim 1, wherein the requesting is initiated by a Wi-Fi access point.

7. The method of claim 1, further comprising:
updating the profile in response to a change in at least one of a username of the subscriber and a password of the subscriber; and
sending the updated profile to the UE using a second GAS Initial Response frame.

8. The method of claim 1, wherein the wireless network is associated with at least one of:
a service provider network; and
an enterprise network.

9. One or more non-transitory tangible media encoding logic that includes instructions for execution that when executed by a processor, is operable to perform operations comprising:
requesting, by a user equipment (UE), a profile associated with a subscriber, wherein the profile provides information to facilitate automatic association of the UE with one or more access points of a wireless network, wherein the requesting includes requesting the profile using a Generic Advertisement Service (GAS) Initial Request frame;
determining a subscription identifier of the subscriber, based on a unique identifier of the UE;
determining a username and a password for the subscriber, based on the determined subscription identifier; and
sending the profile to the UE using a GAS Initial Response frame, wherein the profile comprises the username and the password for the subscriber.

10. The media of claim 9, the operations further comprising:
configuring a Vendor Specific Information Element (VSIE) within an Advertisement Protocol Identifier for the GAS Initial Request frame.

11. The media of claim 10, the operations further comprising:
configuring the VSIE to indicate an Access Network Query Protocol (ANQP) query for the profile.

12. The media of claim 9, the operations further comprising:
configuring a Vendor Specific Information Element (VSIE) within an Advertisement Protocol Identifier for the GAS Initial Response frame.

13. The media of claim 12, the operations further comprising:
configuring the VSIE to indicate an Access Network Query Protocol (ANQP) query response including the profile.

14. The media of claim 9, wherein the requesting is initiated by a Wi-Fi access point.

15. The media of claim 9, the operations further comprising:
updating the profile in response to a change in at least one of a username of the subscriber and a password of the subscriber; and
sending the updated profile to the UE using a GAS Initial Response frame.

16. A communication system comprising:
a user equipment (UE) comprising at least one first memory element for storing first data and at least one first processor that executes instructions associated with the first data;
a Wi-Fi Access Point (AP) comprising at least one second memory element for storing second data and at least one second processor that executes instructions associated with the second data;
the UE being adapted when executed by the at least one first processor to:
request a profile associated with a subscriber, wherein the profile provides information to facilitate automatic association of the UE with one or more Wi-Fi access points of a wireless network, wherein the requesting includes requesting the profile using a Generic Advertisement Service (GAS) Initial Request frame; and
the Wi-Fi AP being adapted when executed by the at least one second processor to:
receive, from a remote server, a username and a password for the subscriber, wherein the remote server is configured to determine the username and the password based on a subscription identifier corresponding to the subscriber, wherein the subscription identifier based on a unique identifier of the UE;
send the profile to the UE using a GAS Initial Response frame, wherein the profile comprises the username and the password for the subscriber.

17. The communication system of claim 16, the UE being further adapted when executed by the at least one first processor to:
configure a Vendor Specific Information Element (VSIE) within an Advertisement Protocol Identifier for the GAS Initial Request frame; and
configure the VSIE to indicate an Access Network Query Protocol (ANQP) query for the profile.

18. The communication system of claim 16, the Wi-Fi AP being further adapted when executed by the at least one second processor to:
configure a Vendor Specific Information Element (VSIE) within an Advertisement Protocol Identifier for the GAS Initial Response frame; and
configure the VSIE to indicate an Access Network Query Protocol (ANQP) query response including the profile.

* * * * *